(No Model.)

C. J. MULFORD.
CHOCOLATE POT.

No. 430,783. Patented June 24, 1890.

Witnesses
Jno. G. Hinkel Jr.
J. S. Barker

Chas. J. Mulford
Inventor
By his Attorneys

UNITED STATES PATENT OFFICE.

CHARLES J. MULFORD, OF NEW YORK, N. Y.

CHOCOLATE-POT.

SPECIFICATION forming part of Letters Patent No. 430,783, dated June 24, 1890.

Application filed June 7, 1889. Serial No. 313,474. (No model.)

*To all whom it may concern:*

Be it known that I, CHARLES J. MULFORD, a citizen of the United States, residing in the city, county, and State of New York, have invented certain new and useful Improvements in Chocolate-Pots, of which the following is a specification.

This invention relates to a vessel adapted for the preparation of chocolate and other mixtures for drinking purposes; and it consists in certain improvements upon the chocolate-pot described in my patent, No. 411,870, issued October 1, 1889.

These improvements consist in providing the pot with a duplex clashing-puddler, which experience has demonstrated to be superior to the single puddler shown in my aforesaid application, and, further, in certain changes in the construction of the removable cover of the pot and in the mechanism for operating the puddlers.

Figure 1:
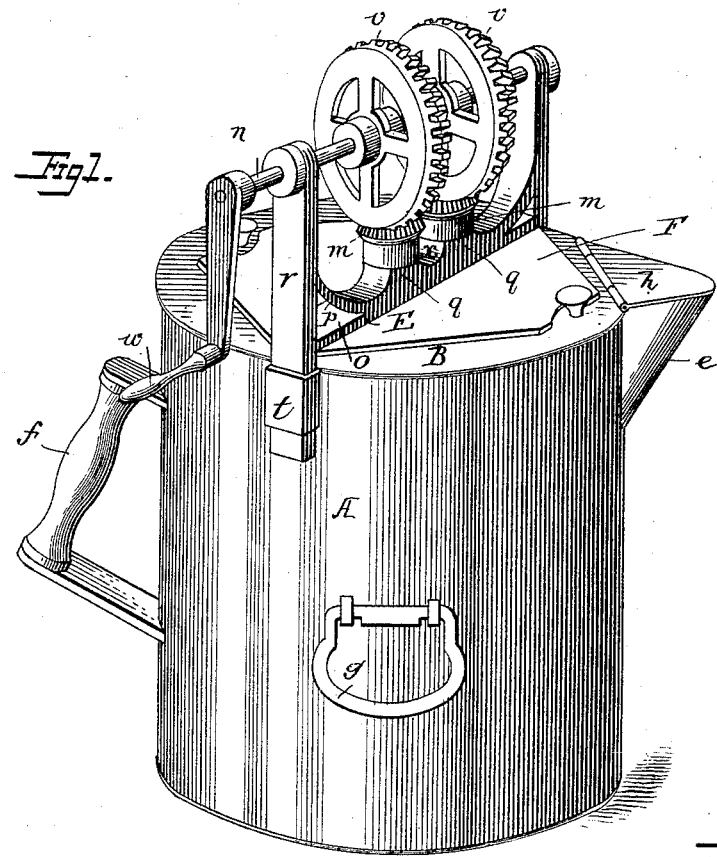
Figure 2:
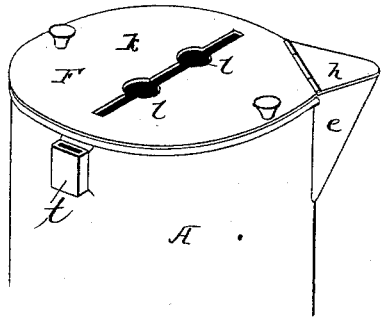
Figure 3:
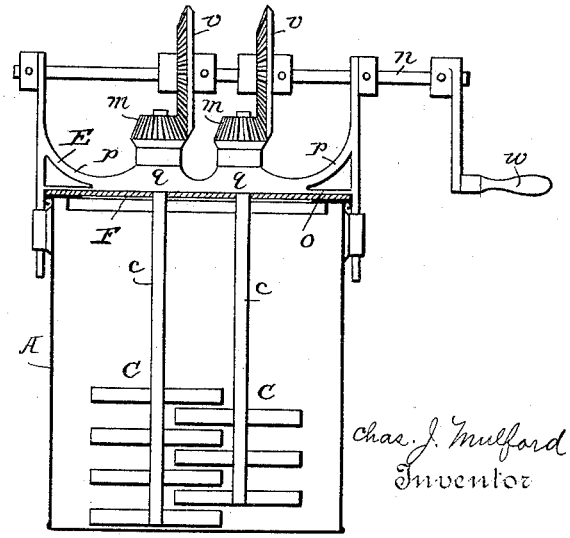

In the drawings, Figure 1 is a perspective view of a chocolate-pot provided with my present invention. Fig. 2 is a perspective view of the upper portion of the pot, the puddlers and their operating mechanism being removed. Fig. 3 is a central sectional elevation.

In the drawings, A represents the pot or vessel, in which the chocolate is to be made, provided with the tipping-handle $f$ and carrying-handles $g$.

B is the removable cover, and $e$ is the spout, through which the contents of the vessel may be poured, the latter being covered by a hinged portion $h$ of the cover B. This cover, as shown in Fig. 2, is provided centrally with a narrow elongated slot $k$ to permit the insertion and withdrawal of the puddlers C without necessitating the removal of the cover B, the slots being enlarged at the two places $l\ l$ for the passage of the shafts $c$ of the puddlers. The shafts of the two puddlers are mounted in a frame E, so as to extend side by side into the pot, and are at such distance apart that their blades interlap, the blades of the two puddlers being arranged alternately, so that they shall not strike one another as they are revolved. The frame E is by preference of cast metal and integral, and consists of the uprights $r$, adapted to enter the ears $t$, carried by the pot, and provided at their upper ends with bearings for the shaft $n$, the horizontal bar $o$ connecting the uprights, and provided with two enlargements $q$, forming the bearings for the upper end of the shafts of the puddlers, and the curved brace-bars $p\ p$ between the uprights and the bearings $q$. The two bearings $q$ are connected by a web $x$, supporting and strengthening them.

The upper end of each of the shafts of the puddlers is provided with a pinion $m$, which in practice rests upon the top of the bearing $q$ and supports the puddler in a vertical position. The pinions are turned, and with them the puddlers, by the bevel-wheels $v$, supported upon the shaft $n$, which is provided at one end with a handle $w$, the wheels and pinions being preferably so arranged as to rotate the two puddlers in the same direction, thereby causing the blades of the puddlers on the adjacent sides of the shaft, and which interlap, to move in opposite directions, thus effecting a more thorough and a better puddling or mixing of the chocolate than were the two puddlers rotated in the same direction.

With the puddling device just described I prefer to use the plate F, which rests upon the cover B and closes the slots $k\ l$ therein; but as this plate is fully described and claimed in my aforesaid application I do not deem it necessary to describe it in detail herein. I have found that the two puddlers, the blades on the two parallel shafts of which interlap without touching each other and rotating in the same direction, produce a more thorough, rapid, and better mixture of the chocolate than can be secured by the single puddler, and is in that respect an improvement thereon.

I am aware that it is old to provide churns with rotating dashes mounted upon two parallel vertically-arranged shafts and with mechanism for rotating said shafts either in the same or opposite directions; but I believe that I am the first to provide a chocolate-pot with a removable puddler having the interlapping blades constructed substantially as I have herein described.

What I claim is—

A chocolate-pot provided with two rotating puddlers mounted side by side and arranged to have their blades interlapped, mechanism for rotating the puddlers, a frame supporting the puddlers, the said frame consisting of the uprights $r$, a cross-bar provided with two bearings $q$, connected by a web $x$ and brace-bars $p$, a shaft mounted in the uprights, and a cover for the pot provided with elongated slots having enlarged spaces $l\,l$ for the shafts of the puddlers, substantially as described.

In testimony whereof I have signed my name to this specification in the presence of two subscribing witnesses.

CHARLES J. MULFORD.

Witnesses:
JAMES B. MITCHELL,
MARSHALL P. STAFFORD.